(12) United States Patent
Proell et al.

(10) Patent No.: US 9,089,826 B2
(45) Date of Patent: Jul. 28, 2015

(54) FLUIDIZED BED REACTOR SYSTEM

(75) Inventors: Tobias Proell, Vienna (AT); Johannes Schmid, Vienna (AT); Christoph Pfeifer, Vienna (AT); Hermann Hofbauer, Vienna (AT)

(73) Assignee: TECHNISCHE UNIVERSITAT WIEN, Vienna (AT)

( * ) Notice: Subject to any disclaimer, the term of this patent is extended or adjusted under 35 U.S.C. 154(b) by 56 days.

(21) Appl. No.: 13/703,408

(22) PCT Filed: Jun. 8, 2011

(86) PCT No.: PCT/AT2011/000254
§ 371 (c)(1),
(2), (4) Date: Feb. 8, 2013

(87) PCT Pub. No.: WO2011/153568
PCT Pub. Date: Dec. 15, 2011

(65) Prior Publication Data
US 2013/0143167 A1 Jun. 6, 2013

Related U.S. Application Data

(60) Provisional application No. 61/353,985, filed on Jun. 11, 2010.

(30) Foreign Application Priority Data

Jun. 11, 2010 (AT) .................................. A 964/2010

(51) Int. Cl.
*B01J 8/02* (2006.01)
*B01J 8/18* (2006.01)
(Continued)

(52) U.S. Cl.
CPC .............. *B01J 8/1872* (2013.01); *B01J 8/0055* (2013.01); *B01J 8/02* (2013.01); *B01J 8/125* (2013.01);
(Continued)

(58) Field of Classification Search
CPC .................. B01J 8/00; B01J 8/12; B01J 8/26; B01J 8/34; B01J 8/38; C10G 11/18; C10J 3/56
USPC ......... 422/139, 140, 141, 142, 187, 600, 630, 422/642, 211; 137/1; 526/65
See application file for complete search history.

(56) References Cited

U.S. PATENT DOCUMENTS 3,267,586 A   8/1966 Victor et al.
3,353,925 A   11/1967 Baumann et al.
(Continued)

FOREIGN PATENT DOCUMENTS

AT   505526 A1   2/2009
DE   10144857 A1   3/2003
(Continued)

OTHER PUBLICATIONS

Berguerand, et al., Design and operation of a 10kWth chemical-looping combustor for solid fuels—Testing with South African coal, Fuel, Apr. 8, 2008, IPC Science and Technology Press, Guildford, GB, vol. 87, No. 12, pp. 2713-2726.
(Continued)

*Primary Examiner* — Walter D Griffin
*Assistant Examiner* — Huy-Tram Nguyen
(74) *Attorney, Agent, or Firm* — Leydig, Voit & Mayer, Ltd.

(57) ABSTRACT

A fluidized-bed reactor system with at least two fluidized-bed reactors, each being a circulating fluidized bed, a particle line with a particle separator for transferring fluidized-bed particles from the first to the second reactor, and a particle line exiting at the lower half of the second reactor for transferring fluidized-bed particles back to the first reactor, wherein, at least in the second reactor, two or more reaction zones separated by one or more flow controllers and that the particle line opens into the second reactor above at least one flow controller.

20 Claims, 7 Drawing Sheets

(51) Int. Cl.
| | |
|---|---|
| C10G 11/18 | (2006.01) |
| B01J 8/00 | (2006.01) |
| B01J 8/12 | (2006.01) |
| B01J 8/26 | (2006.01) |
| B01J 8/34 | (2006.01) |
| B01J 8/38 | (2006.01) |
| C10J 3/72 | (2006.01) |
| F23C 10/00 | (2006.01) |
| F23C 10/10 | (2006.01) |
| F23C 10/01 | (2006.01) |
| F23C 10/18 | (2006.01) |
| C10J 3/48 | (2006.01) |
| C10J 3/56 | (2006.01) |
| C10J 3/74 | (2006.01) |

(52) U.S. Cl.
CPC .... *B01J 8/26* (2013.01); *B01J 8/34* (2013.01); *B01J 8/388* (2013.01); *C10G 11/18* (2013.01); *C10J 3/482* (2013.01); *C10J 3/56* (2013.01); *C10J 3/721* (2013.01); *C10J 3/725* (2013.01); *C10J 3/74* (2013.01); *F23C 10/005* (2013.01); *F23C 10/01* (2013.01); *F23C 10/10* (2013.01); *F23C 10/18* (2013.01); *B01J 2208/00849* (2013.01); *C10J 2300/093* (2013.01); *C10J 2300/0956* (2013.01); *C10J 2300/0959* (2013.01); *C10J 2300/1606* (2013.01); *C10J 2300/1807* (2013.01); *F23C 2900/99008* (2013.01); *Y02E 20/346* (2013.01)

(56) References Cited

U.S. PATENT DOCUMENTS

| | | | | |
|---|---|---|---|---|
| 3,495,952 | A * | 2/1970 | Kadlec et al. | 422/647 |
| 3,770,714 | A * | 11/1973 | Dorschner et al. | 526/65 |
| 5,580,241 | A * | 12/1996 | Koeberle | 432/58 |
| 6,276,441 | B1 * | 8/2001 | Ruottu | 165/104.16 |
| 8,277,736 | B2 * | 10/2012 | Proll et al. | 422/141 |
| 8,333,951 | B2 | 12/2012 | Muehlen | |
| 2006/0180060 | A1 * | 8/2006 | Crafton et al. | 110/341 |
| 2009/0020405 | A1 * | 1/2009 | Fan et al. | 201/12 |
| 2009/0149610 | A1 * | 6/2009 | Sato et al. | 526/65 |

FOREIGN PATENT DOCUMENTS

| | | |
|---|---|---|
| DE | 102007005799 A1 | 4/2008 |
| EP | 1637574 A1 | 3/2006 |
| WO | WO 2009021258 A1 | 2/2009 |

OTHER PUBLICATIONS

Hsiaotao, et al., Flooding of Gas-Solids Countercurrent Flow in Fluidized Beds, Industrial & Engineering Chemistry Research, Sep. 1, 2004, American Chemical Society, vol. 43, No. 18, pp. 5611-5619.

Yong Jin et al, Chapter 7: Effect of Internal Tubes and Baffles, Handbook of Fluidization and Fluid-Particle Systems, Mar. 19, 2003 CRC Press Taylor & Francis Group LLC.

Bu et al., Influence of ring-type internals on axial pressure distribution in circulating fluidized bed, The Canadian Journal of Chemical Engineering, Feb. 1, 1999, John Wiley & Sons, vol. 77, No. 1, pp. 26-34.

Kersten et al., Principles of a novel multistage circulating fluidized bed reactor for biomass gasification, Chemical Engineering Science, Feb. 1, 2003. Oxford, GB, vol. 58, No. 3-6, pp. 725-731.

Schmid et al., G-Volution : Biomasse-Dampfvergaser der zweiten Generation, Jan. 31, 2011, p. 1-38.

A.W.M. Roes and W.P.M. Van Swaaij, Chem. Eng. J. 17, 81-89 (1979).

European Patent Office, International Search Report in International Patent Application No. PCT/AT2011/000254 (Nov. 4, 2011).

* cited by examiner

FLUIDIZED BED REACTOR SYSTEM

CROSS REFERENCE TO RELATED APPLICATIONS

The present application is the national stage of international application PCT/AT2011/000254, filed on Jun. 8, 2011, published as WO 2011/153568 A1 on Dec. 15, 2011, and claims the benefit of the filing dates of Austrian application Serial No. 964/2010 A, filed on Jun. 11, 2010, and U.S. provisional application Ser. No. 61/353,985, filed on Jun. 11, 2010.

The present invention relates to an improved fluidized-bed reactor system consisting of at least two fluidized-bed reactors provided in the form of circulating fluidized beds.

STATE OF THE ART

Both in physical procedures and chemical reactions, involving an exchange of material between two phases, large contact surfaces and thorough mixing of the phases are just as decisive as long residence times in corresponding contact or reaction zones in order to obtain high turnover and yields. This equally applies to all phase transfers, regardless whether the material exchange is to take place between solid, liquid or gaseous phases.

One possibility for extending contact times and increasing contact surfaces or the number of contacts with discrete particles in the case of solid-liquid and solid-gas contacts consists in leading the two phases to be contacted in countercurrent flow, as it is, for example, described for spray columns, (sometimes multi-staged) fluidized-bed reactors, countercurrent contactors and packed columns by A. W. M. Roes and W. P. M. Van Swaaij, Chem. Eng. J. 17, 81-89 (1979). In DE 10 2007 005 799 A1 (published on 24 Apr. 2008), the countercurrent principle is described as a specific example of combustion reactions. Therein, pyrolysis coke is used as a fuel and converted into a product gas which is rich in hydrogen and has a high calorific value, wherein bulk material serving as heat transfer medium is circulated by means of a bulk material conveyer and is conducted in countercurrent flow to the gas stream containing the product gas.

Another possibility for increasing the surface, which is also suggested by Roes and Van Swaaij (supra), provides for internals, which are well known in the field of packed columns or rotating disk columns.

An increase of the residence times in contactors or reactors may, for example, also be achieved by providing flow controllers or restrictors to create zones of differing flow rates of the phases to be contacted with each other. One example of such a fluidized-bed reactor is described in Kersten et al., Chem. Eng. Sci. 58, 725-731 (2003). Therein, a circulating fluidized-bed reactor for biomass gasification is described, which is partitioned into zones of different densities of both the circulating solid and the carrier and combustion gases by means of a regular sequence of conical expansions in the riser, wherein solid particles and gases are conducted in the riser in cocurrent flow. A similar example for improving the flow profile in a fluidized-bed reactor is described by J. Bu and J.-X. Zhu, Canadian J. Chem. Eng. 77, 26-34 (February 1999), where annular internals are provided in the riser of a circulating fluidized-bed reactor, having a similar effect as the conical expansions of Kersten et al. (supra).

For fluidized-bed reactor systems in which two or more fluidized reactors communicate with each other, the above measures for improving contact or material exchange between two phases, specifically between a solid and a liquid or gaseous phase, have been unknown so far. This is, of course, partly due to the fact that, in the past, particle discharge from a second reactor absolutely had to be fed into a first reactor as long as there were two fast fluidized, i.e. particle-transporting, bed reactors, in order to close the solids flow cycle. See, for example, EP 1,637,574 A1. FIGS. 1 and 2 therein show a fluidized-bed reactor system consisting of two communicating reactors that may both be fast fluidized bed reactors. Since solids discharged from one reactor have to be cross-charged into the other reactor, the gas and solid streams of the two reactors have to flow cocurrent-wise. FIG. 3 of EP 1,637,574 A1 also shows a system consisting of two communicating reactors where a gas and a solid are contacted in the second reactor in countercurrent flow. However, the second reactor is a bubbling fluidized bed reactor without solid discharge at the reactor head. The reactor system according to FIG. 3 thus comprises only one fast fluidized bed reactor, in the particle recirculation of which, formally, a bubbling fluidized bed reactor is inserted, through which the particle flow descends before being recycled into the first reactor.

In contrast thereto, the inventors of the present subject-matter presented a fluidized-bed reactor system in their prior applications AT A 1272/2007 and WO 2009/021258, where two fast fluidized, i.e. particle-transporting, bed reactors communicating with each other are connected via a particle line in their lower halves, preferably their lower thirds or quarters, so that the solid particles circulating between the two reactors do not necessarily have to pass two particle separators at the reactor heads. Instead, or additionally, the particles may be transferred directly (or via an optional third interposed reactor) from one reactor to the other in order to close the solids cycle. However, an improvement of the contact between the circulating solids and the feed treated in the reactor system would also be desirable in the new system of the inventors.

DISCLOSURE OF THE INVENTION

The present invention thus provides a fluidized-bed reactor system consisting of at least two fluidized-bed reactors, comprising a first and a second reactor, each being a circulating fluidized bed, a particle line comprising a particle separator for transferring fluidized-bed particles from the first to the second reactor, and a particle line exiting at the lower half of the second reactor for transferring fluidized-bed particles back to the first reactor and characterized in that, at least in the second reactor, reaction zones separated by one or more flow controllers are provided and the particle line for transferring fluidized-bed particles from the first to the second reactor opens into the second reactor above at least one flow controller.

With this inventive interpretation of a fluidized-bed reactor system comprising two fast fluidized bed reactors transporting particles, it is for the first time possible to combine the advantages of the countercurrent principle with those of flow profiles regulated by means of flow controllers, which leads to better intermixing, longer contact times and thus generally better contact between a circulating solid and phases to be contacted therewith, regardless whether solid, liquid or gaseous phases. Furthermore, a lower fluid volume flow is required for elevating the fluidized-bed particles, i.e. for generating and maintaining a fluidized bed, than without flow controller. Among other things, all this allows a more economic operation of such a fluidized-bed reactor system.

Partitioning at least one reactor of the inventive fluidized-bed reactor system into several reaction zones allows, for example, the conduction of different physical or chemical reactions, e.g. a predetermined sequence of chemical reactions, in the individual reaction zones. In addition to generating a counterflow between the particles from the first reactor and the fluid flow in the second reactor, an appropriate selection of the junction position of the particle line from the first to the second reactor allows controlling the reactions taking place in the reaction zones.

Herein, the term "fluid" means generally liquids, gases and mixtures thereof, wherein, for special applications of the inventive fluidized-bed reactor system such as CLR (chemical looping reforming), CLC (chemical looping combustion), coal or biomass gasification and the like, the fluids are preferably gases. Conversely, when there is no reference to specific applications where the use of other fluids than gases is technically impossible, "gas" herein also stands for the general term "fluid".

Due to the facts that the particle line from the first to the second reactor opens into the second reactor above a lowermost flow controller and that below that junction a countercurrent is generated between particles descending in the second reactor and the ascending fluid flow, there is at least one reaction zone where the countercurrent exerts its full effect. For example, if two flow controllers, i.e. three reaction zones, are provided and said particle line opens into the second reactor in the central reaction zone, there is additionally one reaction zone, i.e. the uppermost, in which the fluid and the solids are in cocurrent flow. On the other hand, if the fluid and the solids are to flow countercurrent-wise, the particle line preferably enters above the uppermost flow controller.

Depending on the strength of the fluid flow in the second reactor and on the characteristics of the particles circulating between the two reactors (i.e. specific weight, shape, surface characteristics, etc.), the particles are carried along by the fluid flow to different extents and are thus distributed in the various reaction zones to different extents. This results in a controllable probability of presence of the particles in the individual reactions zones of the second reactor, so that lower reaction zones usually comprise a higher particle mass than higher ones. If the particles (also) serve as heat carriers, e.g. in CLR applications, different amounts of heat are available for chemical or physical reactions in the various reaction zones of the second reactor, in the case of CLR reactors for reforming the fuel in the "fuel reactor".

If particles having different characteristics, e.g. particles of different weights and/or shapes, are present in the system, an accumulation of particles of less weight or larger surfaces (in the following collectively simply termed "lower-weight" particles, for the sake of simplicity) may be achieved in upper reaction zones, while consequently heavier particles or particles with a smaller surface-volume ratio (in the following collectively termed "higher-weight" particles) accumulate in lower reactions zones. Thus, "lower-weight" particles are more often discharged at the head of the second reactor, while the particle line for transferring back fluidized-bed particles to the first reactor preferably circulates "higher-weight" particles. This means that, in addition to the countercurrent effect and the generation of various reaction zones, there is also a sifting of the particles present in the system. Different particles may be specifically introduced into the system and may also be formed therein by physical or chemical reactions, for example by abrasion or combustion (e.g. fly ash).

The flow controllers are not particularly limited and any constriction or expansion of the reactor cross-section, diversion of the particle flow or any combination thereof may be used. Thus, the scope of protection of the invention comprises "zigzag" paths of the reactor pipe as well as the provision of various internals, e.g. central or lateral baffles, annular constrictions, etc., which may be provided in any angle to the flow direction. The type of flow controller is mainly determined by the intended purpose of the respective fluidized-bed reactor system and the reactor wall material used. For example, for CLR, CLC, gasification and other applications which require high temperatures, mainly refractory and other temperature-resistant materials, e.g. chamotte bricks, concrete or graphite, are used as the wall materials.

The present invention also comprises embodiments where not only the second reactor, but also the first reactor and/or optional additional reactors are equipped with flow controllers to define zones of different particle densities therein. In CLC and CLR applications, for example, where a metal oxide, which serves as a heat carrier and an oxidizing agent and circulates between the reactors, is regenerated (i.e. reoxidized) in the first reactor (the "air reactor"), different residence times may be adjusted for the oxide particles to be oxidized present at different heights or in zones of different oxygen densities, which may together with a suitable selection of the air flow result in milder or more economic reactions.

In preferred embodiments of the inventive fluidized-bed reactor system, the second reactor has a particle feedback line with a particle separator, which opens into the second reactor below at least one flow controller provided in the second reactor and/or opens into the first reactor in the lower half thereof. One the one hand, this requires the particles recycled into the second reactor to pass at least one reaction zone located above the junction of the particle feedback line before they are optionally redischarged at the reactor head and again recycled. On the other hand, when the particle feedback line from the second reactor opens into the first reactor at a position in the lower half thereof, preferably in the lower third or quarter thereof, the residence time of the particles in the first reactor is sufficiently long to make them participate in reactions taking place therein. In the above example of a reactor system for CLR applications, this reaction is for example the reoxidation of the heat carrier/oxidizing agent circulating between the reactors. If the particle feedback line from the second reactor has a flow splitter, both embodiments may be implemented simultaneously.

If such a flow splitter is present, part of the solid collected in the particle separator may also be recycled into the reactor system, and the other part may be discharged from the system, for example to subject this solid portion to an external regeneration treatment or because it has lost the desired particle size due to abrasion and should be replaced by suitable particle material.

Additionally, one or both of the particle separators of the first and second reactors may be (a) double- or multi-stage separator(s). For example, in addition to a gravitational separator that directly recycles the (e.g. "higher-weight") solids separated therein into the second reactor, the particle separator of the second reactor may also comprise a centrifugal separator, e.g. a cyclone, that recycles the (e.g. "lower-weight") particles separated therein at a different location into the second reactor or into the first reactor or discharges them. Alternatively or additionally, a double-stage particle separator may be provided for the first reactor, in the two stages of which lower-weight and higher-weight particles are collected and introduced into the second reactor a different heights in order to increase their residence time in the second reactor.

For the same reason, the two particle feedback lines of a double-stage particle separator of the second reactor may open into the second reactor at different heights, e.g. above and below a flow controller, respectively. The inventive fluidized-bed reactor system thus not only allows directing particles countercurrent-wise to the fluid flow, but at the same time enables particles of different sizes to flow countercurrent-wise, which can be especially advantageous in cases where chemical reactions in the reactor system result in particles of different sizes, e.g. in order to recontact solid reaction products with the actual fluidized-bed particles or contact them for a longer period of time.

Generally, neither the design and functional principles of a particle separator of the inventive fluidized-bed reactor system or of its individual stages nor the destination of lines leading away therefrom are particularly limited as long as at least one particle line leads from the first to the second reactor and opens into the latter above at least one flow controller. The particle material accumulating in any other particle separators or lines leading away therefrom may be recycled into the fluidized-bed reactor system at any location or be discharged therefrom if it serves the respective intended purpose of the reactor system.

According to the present invention, all particle lines may be provided with fluid or gas barriers, i.e. are preferably fluidized, in order to prevent fluids, especially gases, from passing from one reactor to the other due to different pressures. Particle lines may be simple chutes, but belt or screw conveyors are also suitable. In preferred embodiments having fluidized lines, the gas barrier is most preferably a siphon, which is especially effective to prevent undesired passages of gas, but also of solids, from one reactor into the other.

Particularly preferred is a fluidized particle line for transferring back fluidized-bed particles from the second to the first reactor, and even more preferably it is provided with a siphon. This does not only, as mentioned above, prevent undesired passages of material between the reactors, but also clogging of the particle line, since in particularly preferred embodiments these particle lines open into the first reactor at low heights, which guarantees the inventive reactor systems to work continuously.

In a manner conventional per se, both reactors may be provided with stepped fluid inlets, e.g. with several fluid inlets at different heights of the respective reactor, which supports the maintenance of the fluidized bed in the reactor. If stepped fluid inlets are provided in the first reactor, the lowermost fluid inlet may be replaced by a fluidized particle line for transferring back fluidized-bed particles from the second to the first reactor.

Furthermore, in particular embodiments, one or more further reactors may be provided in addition to the two reactors mentioned, which further reactors may be mounted at any position within the inventive fluidized-bed reactor system. For example, a third reactor may be operated in parallel with the first or second reactor so that the third rector exclusively communicates with the second or with the first reactor. Alternatively or additionally, a third reactor may in both directions of the circulating particle flow be interposed between the first and second reactors. This means that the particle flow from the first reactor may first be conducted into a third reactor before it passes from there to the second reactor, or the feedback of the particles from the second to the first reactor flows through a third reactor. In the latter case, such a third reactor may be positioned either in the particle line for transferring back fluidized-bed particles from the second to the first reactor, or in a particle feedback line leading from the particle separator of the second reactor to the first reactor. Any combination of these embodiments, i.e. by adding several further reactors, is possible.

The operating mode of the third reactor and any further reactors is not particularly limited. They may be operated as fast fluidized bed reactors, bubbling fluidized bed reactors or in any other way, as long as the advantageous effects of the inventive fluidized-bed reactor system are not impaired.

In the following, the present invention is described in further detail with reference to specific embodiments shown in the enclosed drawings.

SHORT DESCRIPTION OF THE DRAWINGS

DETAILED DESCRIPTION OF THE INVENTION

Generally, the invention relates to a fluidized-bed reactor system consisting of at least two fluidized-bed reactors, each being a circulating fluidized bed, wherein at least one of the reactors is partitioned into separated reaction zones by means of one or more flow controllers. In at least some of the reaction zones, material flows to be reacted with each other are additionally directed countercurrent-wise to each other, i.e. a solids flow is conducted countercurrent-wise to a reaction gas flow, and/or two solids flows, e.g. one solid serving as reactant and another solid serving as catalyst, are conducted countercurrent-wise to each other.

This type of flow management is, as mentioned above, based on the prior invention of the inventors of the present subject-matter and described in AT A 1272/2007 and WO 2009/021258. Without the particle line disclosed therein for connecting the two reactors and the (direct) feedback of the particle flow from the second reactor to the first reactor, an implementation of the countercurrent principle would be technically impossible. Reaction zones could have been contemplated, but their effects are strongly increased by countercurrent material flows therein, so that all three elements of the present invention together have a synergistic effect.

Below, several preferred embodiments of the fluidized-bed reactor system of the invention are described in more detail with regard to their operating mode and with reference to the drawings, wherein a CLC, i.e. chemical looping combustion, system, is used for illustrative purposes. However, it is to be understood that the inventive fluidized-bed reactor system is also suitable for any other physical or chemical reactions.

CLC is an energy conversion process with theoretically no efficiency loss, wherein a fuel, e.g. coal or natural gas, is combusted, usually with the exclusion of air, in a fuel or combustion reactor by use of an oxygen carrier serving both as an oxidizing agent and as a catalyst, while the oxygen carrier is regenerated in a second reactor, i.e. the air reactor.

The oxygen carrier/catalyst is usually a metal oxide which is reduced in the fuel reactor and reoxidized in the air reactor. During combustion, mainly $CO_2$ and $H_2O$ are formed, from which $CO_2$ may be obtained after condensation of the water.

Figure 1:
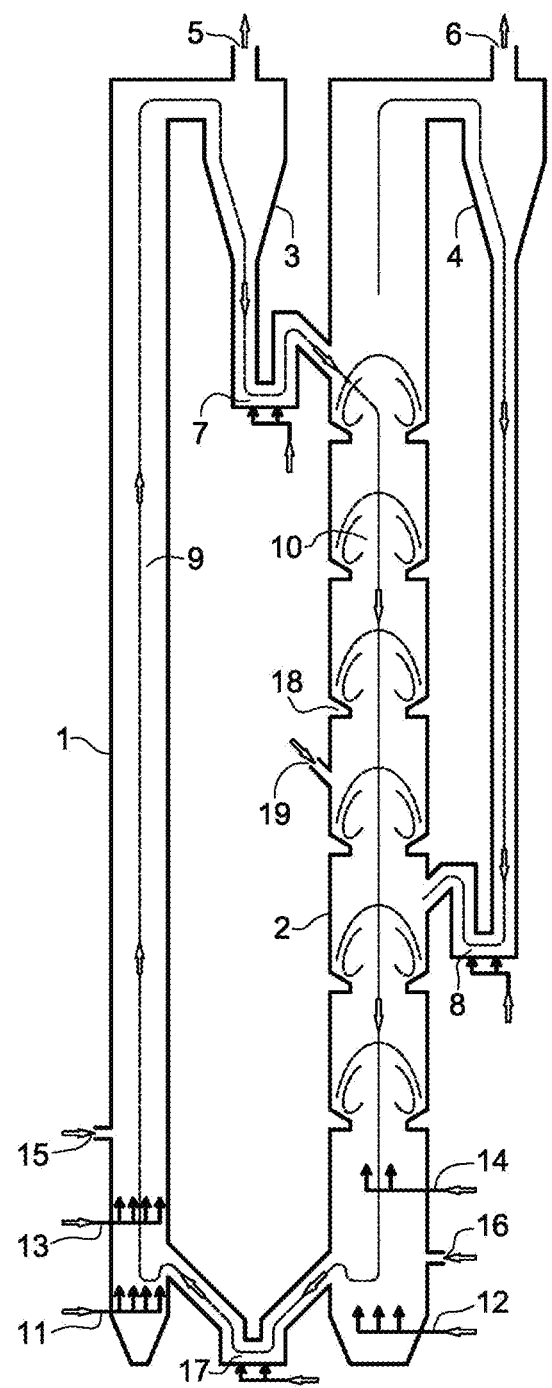
FIG. 1 shows an embodiment of the inventive fluidized-bed reactor system, comprising flow controllers only in the second reactor.

FIG. 1 shows a preferred embodiment with two fast fluidized, i.e. particle-transporting, reactors 1 and 2. Solids discharged from the first reactor 1 are collected in a particle separator 3, while gas is discharged via outlet 5. For the CLC example, the first reactor 1 is the air reactor, so that mainly $N_2$ and $O_2$ are discharged at 5, while the oxygen carrier, i.e. for example a metal oxide, is separated at 3 and introduced into the second reactor 2 via a particle line 7. The particle separator 3 is not particularly limited and may for example be a gravitational or a centrifugal separator, preferably a cyclone. The particle line 7 is also not particularly limited and may for example be a screw conveyor, a simple chute, or the like. As shown by black arrows in FIG. 1, it is preferably fluidized with an inert gas, so that for the gas barrier between the reactors a siphon may be preferably used, although any other gas barrier providing a sufficient pressure difference between the gas phases to be separated is also suitable, e.g. fluidized chutes or the like.

By selecting the position at which the particle line 7 from the first reactor 1 opens into the second reactor 2, one may control to what extent the particles are led countercurrent-wise to the material flows in the second reactor, i.e. gas or fluid or solids flows. (Product) material flows are marked with white arrows in all drawings. FIG. 1 shows a preferred embodiment where line 7 enters at a very high position, above the uppermost flow controller 18, i.e. in the uppermost reaction zone 10, which will be explained in more detail later. From there, the particles descend within the fluidized bed of the second reactor 2, so that a flow of these particles counter-current-wise to the gas flow, and sometimes also the solids flow, in this reactor is guaranteed for the most part of its height.

The fluidized-bed reactor 2, in the CLC example the fuel reactor, is also fast fluidized and comprises a gas outlet 6, a particle separator 4, and a particle line or feedback line 8, which is also shown fluidized in the present example and is thus preferably a siphon, even though the particle separator 4 and the particle line 8 are again not particularly limited. In the example of FIG. 1, the particle line 8 opens into the second reactor 2 and thus recycles discharged solids thereto. The position marked in FIG. 1, at which the feedback line 8 opens into the reactor 2, is at a relatively low height, which has the effect that the larger part of the solids thus recycled ascends again in the fluidized bed of the reactor (e.g. ash particles that still contain a portion of combustible material) and is thus conducted countercurrent-wise to the particles introduced from the first reactor 1. The latter particles pass the reactor 2 countercurrent-wise to the gas flow as well as to a solids flow therein. A smaller portion (e.g. descends and, due to introduction at a relatively low height, opens into Even though both reactors transport particles, in contrast to reactor 1, which is entirely particle-transporting, reactor 2 is realized in an only partly transporting manner. This means that all solids present in the fluidized bed of reactor 1 are discharged and introduced into the second reactor 2, while reactor 2 only discharges a small portion of the solid particles present therein at the reactor head. In practice, e.g. in CLC applications, this is a more or less small portion, on the one hand because, if possible, the total oxygen carrier mass should be cycled between the two reactors, and on the other hand because the solid fuel in reactor 2 should be combusted as completely as possible. In this example, the discharge from reactor 2 thus consists mainly of relatively fine components, e.g. abrasion of the oxygen carrier or fly ash. However, in practical applications, there is always a certain portion of coarser-grained, "higher-weight" particles in the discharge from reactor 2 because all particles have a defined (even though sometimes rather low) probability of presence at any location within the reactor system.

Both reactors 1, 2 have two-part inlets 11-14, i.e. the fluidization gas or fluid is introduced into the respective reactor at different heights, which supports the maintenance of the fluidized beds and makes it easier to introduce different fluids/gases into the respective reactor. In the case of CLC, for example, fresh air may be introduced into reactor 1 at 11, while at 13 a nitrogen/oxygen mixture recycled from outlet 5 may be introduced. Due to the presence of a feed-line 15, fresh air may also be introduced at 11 and 13, while at 15 the recycled gas flow is fed back, or pure oxygen or an additional fuel for heating the particles in reactor 1 may be introduced at 15 (or at 11 and/or 13). However, the respective purpose of a fluid feed-line is not particularly limited according to the present invention.

A particle line 17 connects the two reactors, preferably at the lowermost ends, and recycles the solids flow, in the CLC example the metal oxide, into the first reactor. Line 17 is similar to particle lines 7 and 8, i.e. it is preferably fluidized and provided in the form of a siphon. The fact that the exit point of particle line 17 from the second reactor is positioned between the inlets 12 and 14 has the effect that the portion of the gas (e.g. methane) introduced at 12 may contact the particle flow before the latter leaves reactor 2. The entry point of particle line 17 between the inlets 11 and 13 of reactor 1 has the effect that the particle flow is more homogeneously distributed in the reactor. Since particle line 17 is fluidized, its junction could also replace the lower fluid inlet 11. Generally, the relationship between the particle flows and the residence times of the particles in the individual reactor sections can be well controlled by appropriately selecting of the gas flows.

Reactor 2 of FIG. 1 is partitioned, according to the invention, into seven reaction zones 10 by a total of six flow controllers 18, in which reaction zones the solids contained in the system have different probabilities of presence and residence times, which again is controllable by means of the gas flows, but also by means of the type and design of the flow controllers. By means of the controllable strength of the fluid or gas flow through the second reactor, the contact times between the reaction partners in the individual reaction zones are also controllable.

Figure 6:
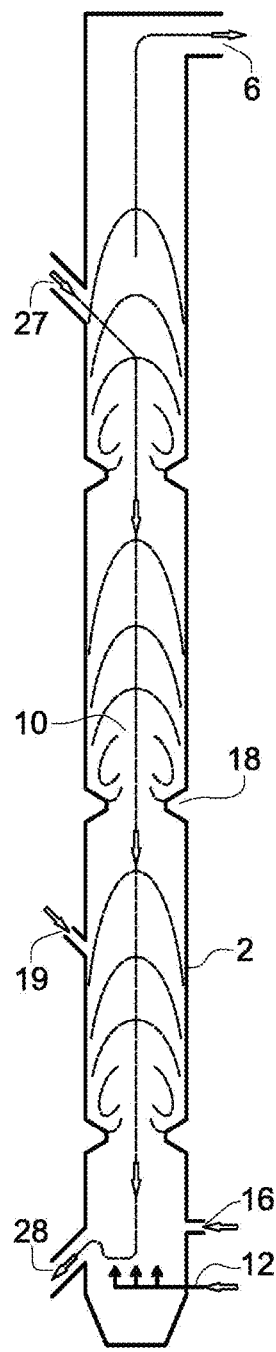
FIG. 6 shows a detailed view of a reactor partitioned into reaction zones by flow controllers in an inventive fluidized-bed reactor system.

The presence of the fluidized-bed particles, their global flow direction and fluidization in the reactors and the reaction zones thereof are indicated by dashed lines in FIG. 1 and the other drawings enclosed. This can be seen especially in FIG. 6 which shows a detailed view of a second reactor 2 partitioned into reaction zones by means of flow controllers in an inventive fluidized-bed reactor system, but does not show the feedback of particles into the second reactor. The type of the flow controller 18 is, as mentioned above, not particularly limited. FIG. 1 and FIG. 6 show embodiments with (e.g. annular) constrictions or narrowings of the reactor cross-section.

In the preferred embodiment of FIG. 1, feed lines into reactor 2 are shown at 16 and 19, the purpose of which is not particularly limited; in the CLC example, however, they are fuel feed lines. For example, at 16 a gaseous fuel such as methane may be introduced, while at 19 a feed at least partly consisting of solids, e.g. coal, may be introduced.

Viewed as a whole, the inventive fluidized-bed reactor system shown in FIG. 1 for a CLC example allows (re)oxidizing and heating an oxygen carrier in air reactor 1, which is then fed via particle line 7 into the uppermost reaction zone 10 of the fuel reactor 2, where it continuously descends within the fluidized bed and provides for the oxidation, i.e. combustion, of one or more fuels in the individual reaction zones, which fuels may be introduced at 16 and/or 19. Then, the oxygen carrier is fed back into air reactor 1 and regenerated. In fuel reactor 2, solid, but relatively finely dispersed combustion residues, e.g. fly ash in the combustion of coal, may be collected in particle separator 4 and recycled via particle line 8 into the system, where they are again contacted with the oxygen carrier, which guarantees complete combustion of the fuel. At the same time, another, e.g. gaseous, fuel such as methane may be introduced, so that different amounts of different reaction partners are present in the individual reaction zones 10 which may have different temperatures and thus provide for different net reactions. For example, these reactions create varying amounts of heat and solid reaction products of varying sizes, depending on the position of the respective reaction zone. In this way, in total, completeness of the combustion reactions and increases of the yields and efficiency of the process are obtained.

Figure 2:
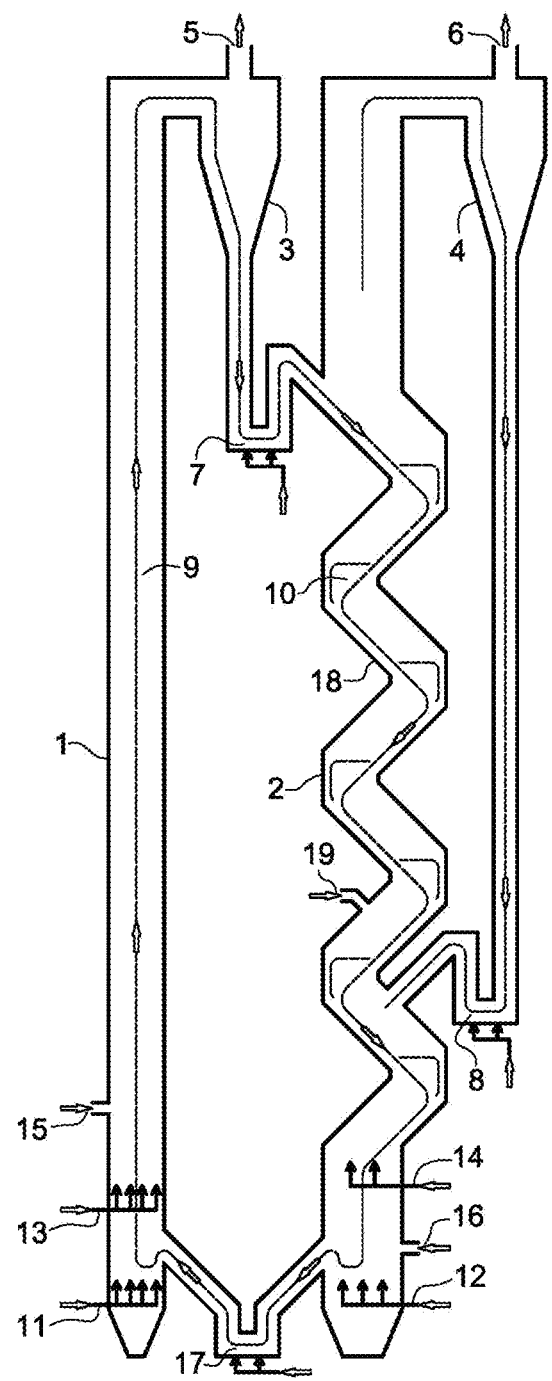
FIG. 2 shows an embodiment of the inventive fluidized-bed reactor system, comprising a different type of flow controller only in the second reactor.

FIG. 2 shows an alternative preferred embodiment of the invention, where flow controllers 18 are provided in the form of zigzag paths or "chutes" with additional internals being shown as angles. The mode of operation of this system is the same as described in connection with FIG. 1.

Figure 3:
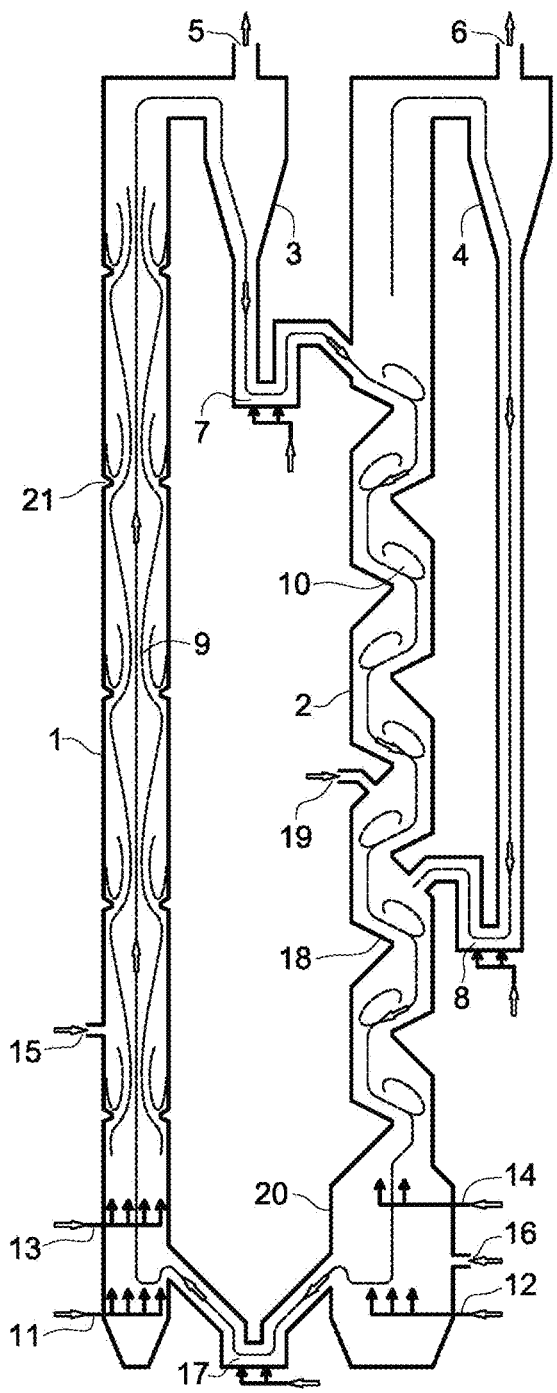
FIG. 3 shows an embodiment of the inventive fluidized-bed reactor system, comprising flow controllers in both reactors and an interposed third reactor.

FIG. 3 shows, in reactor 2, a combination of the designs of the flow controllers 18 of FIG. 1 and those of FIG. 2, i.e. constrictions of the reactor cross-section as well as diversions, which may lead to even longer residence times of the particles, e.g. metal oxide oxygen carrier particles, in the individual reaction zones. This embodiment also comprises continual cross-sectional changes within the reaction zones of reactor 2. Additionally, in this embodiment, reactor 1 also comprises flow controllers 21 which partition it into several reaction zones 9. When used for CLC, this may for example allow a stepwise and thus potentially milder regeneration of the oxygen carrier in the air reactor 1, especially when fuel for heating the oxygen carrier is fed into the air reactor via feed-line 15.

Furthermore, between the second and the first reactor, i.e. as seen in the direction of the particle flow circulating between the two rectors, a third reactor 20 is provided at the lower end of reactor 2, which is shown as bubbling fluidized bed or BFB reactor and thus is not particle-transporting. However, like any further reactor, the third reactor is not limited thereto and may be implemented at any position of the inventive fluidized-bed reactor system and with any flow state, i.e. stationary or transporting, as homogeneous, bubbling, slugging, turbulent or rapid fluidized-bed or with pneumatic transport (see Grace and Bi, 1997). From the third reactor 20, a particle line 17 leads to reactor 1 for recycling the particles.

The stationary fluidized-bed in the third reactor 20 either contains mainly "higher-weight" particles, while reactor 2 positioned above contains "lower-weight" particles, or appropriate control of the fluid feed at 12 and 14 as well as corresponding sizing of the constrictions 18 make sure that a certain portion of particles of the same type remain stationary in reactor 20 while the remainder is subjected to fast fluidization in reactor 2. Likewise, the particles circulating through all three reactors, i.e. the global solids circulation, may consist of substantially equal particles or of particles of different weights, i.e. of different fluidizability.

Because of the low height of the exit point of particle line 17 from the third reactor 20 and due to the above mentioned probability of presence, a more or less large portion of the same particles as in reactor 20 is also present in reactor 1, which strongly depends on the control of the fluid flows in the three reactors and on the strength of the fluidizing flow of line 17. Whether these form a stationary bed at the bottom of reactor 1 or are completely discharged at the head again depends on the strength of the fluid flows, in this case at 11 and 13 and in line 17, as well as on the fluidizability of the particles. Corresponding fluidization and filling height of the fluidized-bed particles may lead to a filling level equilibrium between the first and third reactors, which guarantees continuous operation of the inventive fluidized-bed reactor system.

Again referring to an exemplary CLC process, feeding a fuel, e.g. coal, via feed-line 16 directly into the third reactor 20, containing a stationary fluidized-bed, leads to an intensive first contact between the coal and the oxygen carrier particles that pass through reactor 2 and reactor 20 countercurrent-wise to the gas flows therein and to the coal particles. After the first combustion phase, the reaction products formed from the coal are easier fluidizable and are increasingly whirled up into reactor 2, in the reaction zones 10 of which they have increasing contact with fresh oxygen carrier. After being discharged at the head of reactor 2, the particles are collected in particle separator 4 and via particle line 8 recycled into one of the lower reaction zones of reactor 2. From there, they are for the most part again carried up in the fluidized bed of reactor 2 and again have contact with the oxygen carrier. This supports the complete combustion of the fuel.

Figure 4:
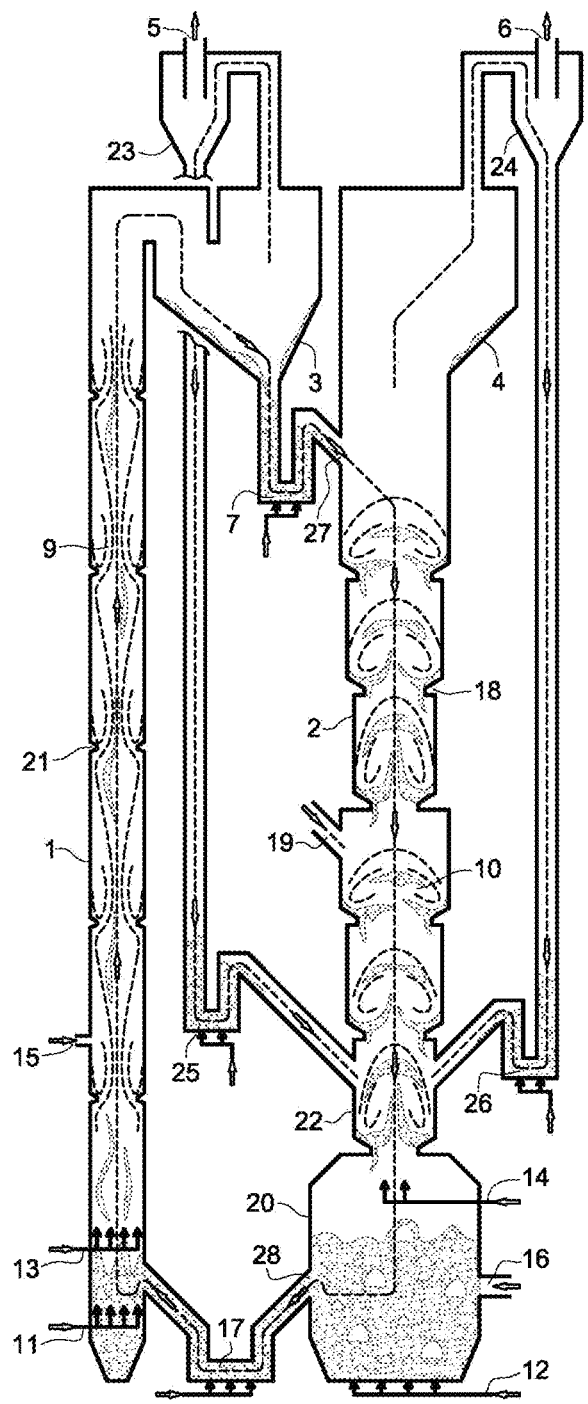
FIG. 4 shows a similar embodiment of the inventive fluidized-bed reactor system as in FIG. 3, but comprising double-stage particle separators.

FIG. 4 shows another embodiment of the fluidized-bed reactor system of FIG. 3, where the particle separators of the two reactors additionally have two stages, so that reactor 1 comprises two particle separators 3 and 23, and reactor 2 comprises two particle separators 4 and 24. Here, the two original particle separators 3 and 4 are indicated as gravitational separators. Separator 3 discharges particles collected therein into particle line 7, from which they are fed into reactor 2 at the junction point 27, while particle separator 4 recycles the particles directly into reactor 2 at the head thereof. Both second stages, i.e. particle separators 23 and 24, feed particles collected therein into the second reactor via particle lines 25 and 26, respectively. In the present case, both particle lines lead into the same, i.e. the lowermost, reaction zone 22 of the second reactor 2. Below that, the third reactor 20 is located.

Other than in the embodiment of FIG. 3, higher-weight particles which still contain a higher portion of combustible components are, after discharge at the head of reactor 2, collected in the first particle separator 4 and directly recycled into reactor 2, e.g. simply allowed to trickle back. Lower-weight particles, e.g. mainly consisting of ash, are collected in the second separator stage 24 and recycled into reactor 2 via particle line 26. The particles collected in the second stage 23 of the particle separator of reactor 1, which, for example, are combustion products carried along or oxygen carrier particles which have undergone abrasion and thus show higher fluidizability, are contacted, in the lowermost reaction zone 22 of reactor 2, with the fuel particles ascending from the third reactor 20, with particles recycled via particle line 26, with oxygen carrier particles subsiding from above, and optionally with solid fuel particles fed via feed-line 19 that mainly descend in the fluidized-bed of the fuel reactor. In this way, lower-weight particles contained in the system also pass reactor 2 countercurrent-wise to higher-weight particles, which again supports complete (combustion) reactions taking place in reactor 2.

In addition, reaction zones 10 positioned above one another have different cross-sections, which leads to different fluidization states therein, which is again indicated with dashed lines.

Furthermore, the inlets of the third reactor 20 are provided at other heights than in the embodiment of FIG. 3. In FIG. 4, the lower fluid feed-line 12 opens into the bottom of reactor 20, which supports the fluidization of the stationary fluidized-bed of the reactor. On the other hand, the exit point of line 17 from reactor 20 is positioned at a relatively low height, i.e. at 28.

Figure 5:
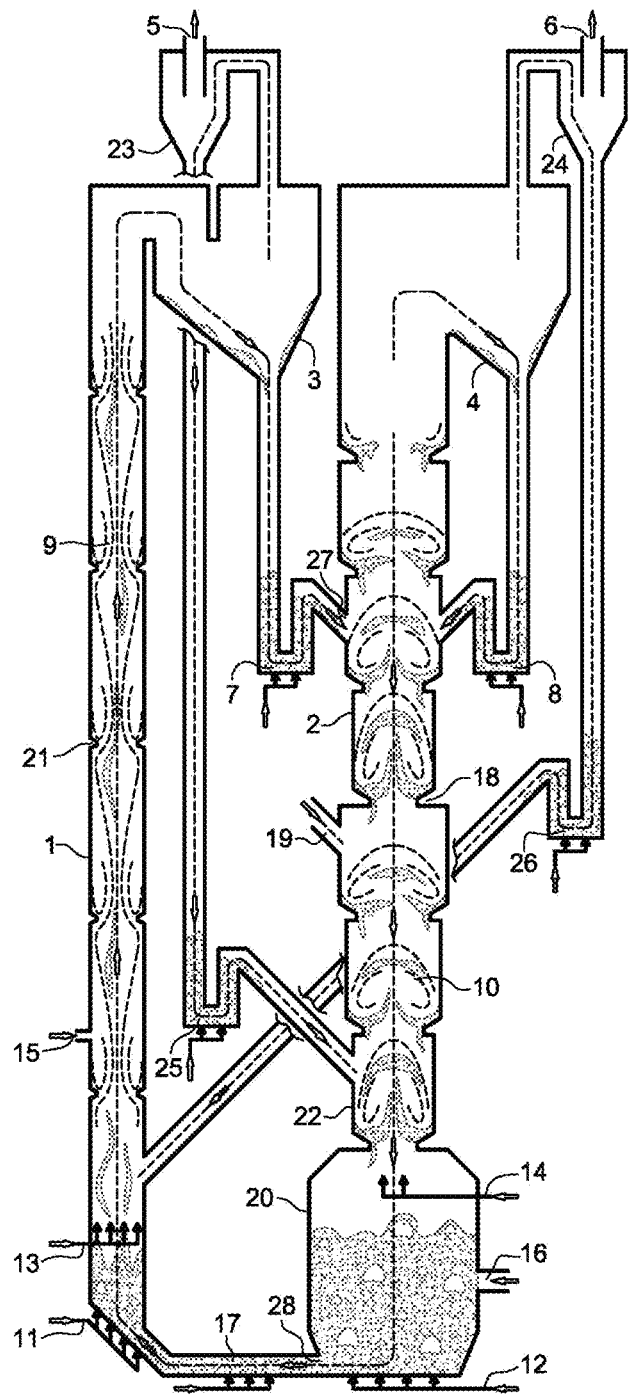
FIG. 5 shows a similar embodiment of the inventive fluidized-bed reactor system as in FIG. 4, but comprising crossing particle feedback lines.

FIG. 5 shows an embodiment similar to FIG. 4 with two-stage particle separators 3, 4, 23, 24 and a third reactor 20. The difference to FIG. 4 relates to the recycling of the particles collected in the two-stage particle separator 4, 24, the junction of particle line 7 with reactor 2 as well as the position of particle line 17.

In the embodiment shown in FIG. 5, the first stage 4 of the particle separator of reactor 1 does not feed particles collected therein back into the head of the reactor, but, via a feedback line 8, back into a lower reaction zone 10, into which also particle line 7 from the first reactor 1 opens. In carrying out a CLC process, solids recycled from separator 4 into fuel reactor 2, which mainly consist of fuel particles, are thus contacted with a fresh oxygen carrier from the air reactor, which again supports their complete combustion.

The lower-weight particles collected in the second separator stage 24, on the other hand, are directly fed into the first reactor, i.e. the air reactor. This is especially useful for a substantially residue-free combustion of the solid fuel(s) in the fuel reactor, so that the particles collected in separator stage 24 mainly consist of oxygen carrier, e.g. abrasion products thereof, which are thus transferred into the air reactor for regeneration without again passing the fuel reactor.

Finally, particle line 17 between the third and the first reactors opens into or exits from the reactors, respectively, at their bottoms. The fluidization flow of line 17 as well as that of the direct fluidization 11 thus allow controlling the extent of the global circulation, i.e. the portion of particles moving from the third to the first reactor. In particular, the selection of appropriate fluidization conditions supports the development of a filling level equilibrium between the first and third reactors.

As mentioned above, FIG. 6 shows a detailed view of a second reactor 2 partitioned into reaction zones within an inventive fluidized-bed reactor system, but without recycling particles into the second reactor and with only single fluidization 12. The countercurrent principle between the fluidized-bed particles supplied at 27 and discharged at 28 and the fluid flow supplied at 12 and discharged at 6 as well as the fluidization of particles within the reaction zones 10 are easily recognizable.

Figure 7:
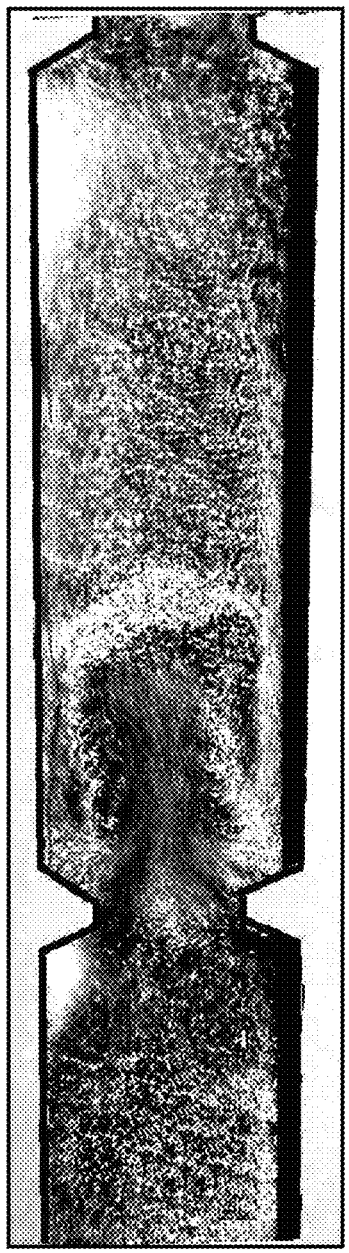
FIG. 7 is a photograph of a reaction zone of an inventive fluidized-bed reactor system.

FIG. 7 is a detail photography of a reaction zone of an inventive fluidized-bed reactor between two flow controllers, which clearly shows the distribution of the fluidized-bed particles within the reaction zone.

Consequently, the above examples, given for illustrative purposes only and thus not to be understood as a limitation, should sufficiently substantiate that the present invention provides an improved fluidized-bed reactor system for executing physical or chemical reactions, wherein reactions may be carried out more rapidly, more completely, with higher yields and thus more economically than would be possible according to the state of the art.

The invention claimed is:

1. A fluidized-bed reactor system, comprising:
a first circulating fluidized-bed reactor;
a second circulating fluidized-bed reactor;
a first particle line comprising a particle separator configured to transfer fluidized-bed particles from the first to the second reactor; and
a second particle line exiting at a lower half of the second reactor, configured to transfer fluidized-bed particles back to the first reactor,
wherein at least the second fluidized-bed reactor comprises two or more reaction zones separated by one or more flow controllers,
wherein the first particle line opens into the second fluidized-bed reactor above at least one flow controller; and
wherein the system is configured to direct particles in a countercurrent flow to a fluid flow of a material feed.

2. The system of claim 1, wherein the one or more flow controllers are (i) constrictions of a reactor cross-section, (ii) diversions of a particle flow, or (iii) constrictions of the reactor cross-section and diversions of the particle flow.

3. The system of claim 1, wherein the first particle line opens into the second fluidized-bed reactor above an uppermost flow controller in the second reactor.

4. The system of claim 1, wherein the second fluidized-bed reactor comprises a particle feedback line comprising a second particle separator, which opens into the second fluidized-bed reactor below at least one flow controller in the second fluidized-bed reactor.

5. The system of claim 1, wherein the first particle separator is a double-stage separator.

6. The system of claim 1, wherein the second fluidized-bed reactor comprises a particle feedback line with a particle separator, which opens into the first reactor in a lower half thereof.

7. The system of claim 1, wherein the second fluidized-bed reactor comprises a second particle feedback line comprising a second particle separator,
wherein the second particle feedback line opens into the second fluidized-bed reactor below at least one flow controller in the second fluidized-bed reactor, and
wherein the second particle feedback line opens into the first fluidized-bed reactor in a lower half of the first fluidized-bed reactor.

8. The system of claim 1, further comprising:
a third fluidized-bed reactor.

9. The system of claim 1, wherein at least the second fluidized-bed reactor comprises at least three reaction zones separated by at least two flow controllers.

10. The system of claim 4, wherein the second particle separator is a double-stage separator.

11. The system of claim 1, further comprising:
a third particle line which opens into the second fluidized-bed reactor above the at least one flow controller.

12. The system of claim 1, wherein the fluidized-bed particles comprise particles of different weights.

13. The system of claim 1, wherein the fluidized-bed particles comprise particles of different shapes.

14. The system of claim 1, wherein the second particle line is a fluidized particle line comprising a siphon.

15. A method of carrying out a chemical reaction, the method comprising:
introducing a feed material into a reaction zone of the fluidized-bed reactor system of claim 1.

16. The method of claim 15, further comprising, while carrying out the chemical reaction:
   directing particles in a countercurrent flow to a fluid flow of the material feed.

17. The method of claim 15, further comprising, while carrying out the chemical reaction:
   directing particles of different sizes countercurrent-wise to each other.

18. The method of claim 15, further comprising, simultaneously with carrying out the chemical reaction:
   sifting the particles therein or further particles resulting from the chemical reaction, according to their size.

19. The method of claim 15, wherein the chemical reaction in the fluidized-bed reaction system comprises converting a fuel.

20. The method of claim 19, wherein the fuel is introduced (i) between two reaction zones, (ii) into a lowermost reaction zone, (iii) into a third reactor, or any combination thereof.

* * * * *